United States Patent
Guatta

[11] Patent Number: 6,069,566
[45] Date of Patent: May 30, 2000

[54] DEVICE FOR MEASURING AND SIGNALING THE INTERNAL TEMPERATURE OF A CONTAINER

[75] Inventor: Andrea Guatta, Roe' Volciano, Italy

[73] Assignee: Guatta Andrea S.p.A, Roe' Volciano, Italy

[21] Appl. No.: 09/203,531

[22] Filed: Dec. 1, 1998

[30] Foreign Application Priority Data

Dec. 2, 1997 [IT] Italy ................................. MI97A2674

[51] Int. Cl.[7] .................................................. G08B 17/00
[52] U.S. Cl. ........................... 340/584; 340/586; 340/594
[58] Field of Search .................................... 340/584, 586, 340/594, 588, 870.17

[56] References Cited

U.S. PATENT DOCUMENTS

| | | | |
|---|---|---|---|
| 4,394,646 | 7/1983 | Gossler | 340/594 |
| 4,571,580 | 2/1986 | Winteler et al. | 340/594 |
| 4,695,829 | 9/1987 | Everett et al. | 340/594 |
| 4,866,427 | 9/1989 | Sciscoe | 340/594 |
| 4,901,059 | 2/1990 | Amann | 340/594 |
| 4,916,436 | 4/1990 | Silliman et al. | 340/594 |

FOREIGN PATENT DOCUMENTS

| | | |
|---|---|---|
| 892 842 | 8/1982 | Belgium . |
| 0 124 484 | 11/1984 | European Pat. Off. . |
| 1 310 599 | 3/1963 | France . |
| 2 379 060 | 8/1978 | France . |
| 402 318 | 5/1966 | Switzerland . |

*Primary Examiner*—Nina Tong
*Attorney, Agent, or Firm*—Oblon, Spivak, McClelland, Maier & Neustadt, P.C.

[57] ABSTRACT

A device for measuring and signaling the internal temperature of a container. The device includes an energy source, an informing device electrically connected to the energy source, and a bimetallic element electrically connected to the energy source. The bimetallic element is configured to deform based upon a variation in the internal temperature of the container. The device further includes a selector configured to provide for the selection of a predetermined temperature valve and having a conductive portion electrically connected to the informing device. The bimetallic element is configured to contact the conductive portion when the internal temperature of the container reaches the predetermined temperature value, thereby creating a closed electrical loop that actuates the informing device.

20 Claims, 2 Drawing Sheets

DEVICE FOR MEASURING AND SIGNALING THE INTERNAL TEMPERATURE OF A CONTAINER

FIELD OF THE INVENTION

This invention refers to a device for measuring and signaling the internal temperature of a cooking container, such as of a pot, a pan or the like.

DISCUSSION OF THE BACKGROUND

At present, in order to have an indication of the temperature attained inside a cooking container, a measurement is carried out by using thermometers or metallic transducers inserted into the knob of the lid or the handles of the container, so as to obtain an external indication on appropriate displaying devices. However, the temperature sensing devices (thermometers) currently produced and used according to traditional techniques present numerous drawbacks, such as the use of multiple components, the difficulty of performing adjustments or calibrations for their initial setup, the lack of precision and poor reproducibility of the measurements of the system. Other devices already in use are capable of emitting an acoustic signal upon reaching a preset temperature level. They are generally constituted by a system based on the reception and refraction of light beams and photocells operating in combination with an already existing thermometer or bimetallic indicator; as the indicator crosses the range of action of the photocells, a bell is sounded.

Alternatively, some digital measuring systems are used, where an electronic system converts the temperature value measured by a sensor into a numerical index; the circuit may be arranged for the setting up of temperature values, so that upon reaching a certain level of temperature or the corresponding numerical value a bell is sounded.

It is evident, however, that even in the cases mentioned above numerous drawbacks occur, which are related to the poor operating reliability of the electronic devices, especially in relation to considerable temperature excursions, difficult ambient conditions, humidity, dust and dirt.

In the first case, in fact, at least one fixed element of the thermometer, capable of actuating a bell, must be provided on a cooking container, where an electronic device can be provided.

In the second case, it is similarly necessary to provide a temperature measuring device, connected to a controlling circuit and capable of converting the measured data into signals or numbers.

SUMMARY OF THE INVENTION

The purpose of this invention is therefore to produce a device for measuring and signaling the internal temperature of a container capable of avoiding the mentioned drawbacks, or to produce a device for measuring and signaling the internal temperature of containers, capable of allowing an instant visual or acoustic signaling of the temperature attained by the product in the cooking container, and simultaneously endowed with the specific function of permitting the user to preset a desired temperature value or range of values.

Another purpose of this invention is to produce a device for measuring and signaling the internal temperature of a container by utilizing the least possible number of components with respect to the traditional devices.

A further purpose of the invention is to produce a device for measuring and signaling the internal temperature of a container, of a fixed or mobile kind, capable of being positioned on various types of containers, in various ways and positions.

An additional purpose of this invention is to indicate a device for measuring and signaling the internal temperature of a container, whose action does not require any preliminary adjusting, calibrating or positioning operations, that is without utilizing sophisticated and costly electronic systems or accessories.

Not the last purpose of the invention is to indicate a device for measuring and signaling the internal temperature of a container, capable of being produced in a simple and inexpensive manner, without the use of expensive components and/or complex and costly technologies.

These purposes are achieved by a device for measuring and signaling the internal temperature of a container according to claim 1, being referred to for brevity.

Advantageously, the device for measuring and signaling the internal temperature of a container, object of this invention, comprises a connecting element to the cooking container, a transducer device measuring the temperature inside the container, a bimetallic element deforming under the effect of the temperature measured by the transducer it is attached to, a pivoting contact plate connected to a temperature selector and programmable from the outside by a user, and a bell connected to an supply battery.

The bimetallic element is connected to the negative battery pole, and upon deforming in relation to the temperature measured by the transducer, intercepts the pivoting contact plate which has been previously positioned by the user with the aid of an external selector, thus triggering the bell.

BRIEF DESCRIPTION OF THE DRAWINGS

The characteristics of the invention will become more evident from the following description and the attached drawings, referring to an embodiment of an exemplifying but non-limiting character, in which.

DETAILED DESCRIPTION OF THE PREFERRED EMBODIMENTS

With reference to the mentioned figures, 21 generally indicates a cooking container, on whose external surfaces (lateral surface, lid, or bottom) a device for measuring and signaling the internal temperature of a container, generally indicated by the reference number 20, is installed.

The device 20 essentially comprises a hollow body, sealed by a connection between two distinct items, the upper part or lid 2 and the lower part or base 1.

Figure 1:
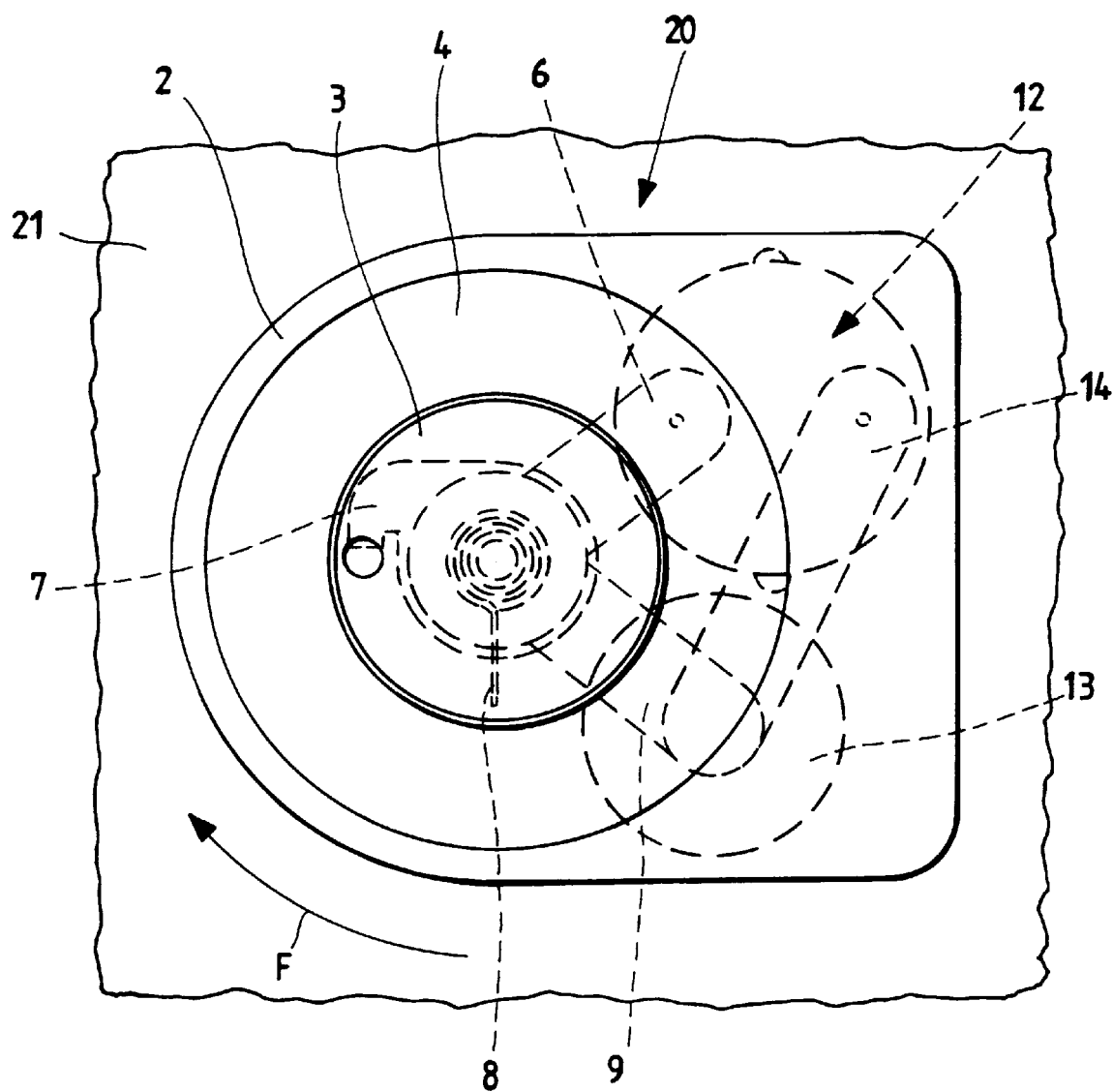
FIG. 1 shows a top view of an exemplifying but non-limiting embodiment of the device for measuring and signaling the internal temperature of a container, in particular of a cooking container, according to this invention, applied to the mentioned container.
Figure 2:
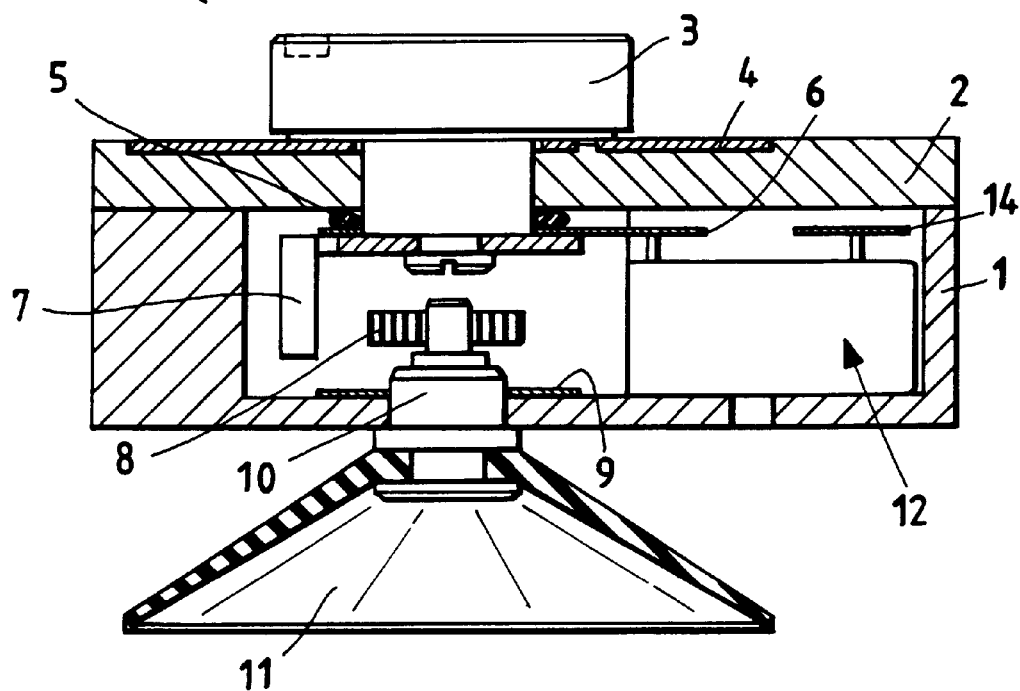
FIG. 2 is a sectionalized side view of FIG. 1, according to this invention.
Figure 3:
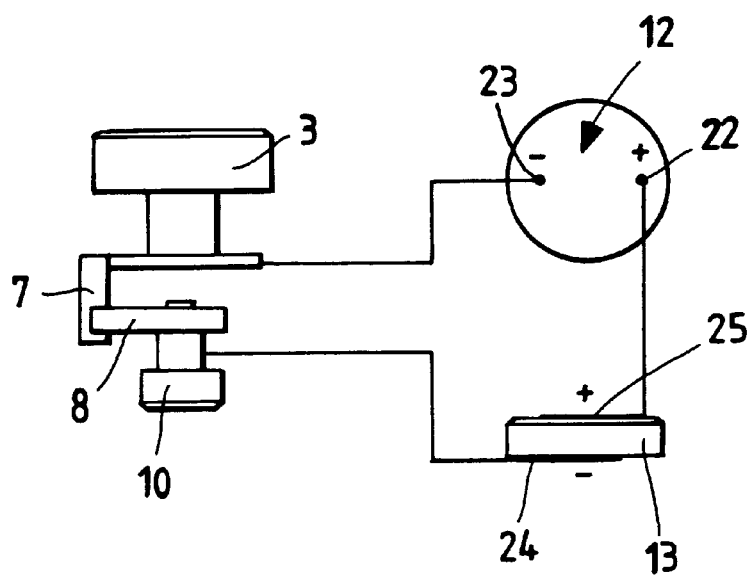
FIG. 3 is a general view of an electrical operating circuit of the device for measuring and signaling the internal temperature of containers, according to this invention.

The upper part 2 houses a selector 3 programmable by an outside user by rotating it in the sense of the arrow F in FIG. 1, on a graduated reference scale 4.

The number 5 indicates a friction gasket interposed between the lower surface of the lid 2 and a first fixed contact strip 6, while 7 indicates a pivoting contact plate associated with the mechanical selector 3.

The lower part 1 of the device 20 holds a bimetallic element 8, mounted on a metallic transducer 10, which is in turn connected to the support of a fastener of the device 20 to the container 21; this fastener is in a preferable, but non-limiting manner constituted by a suction cup 11 to be attached to the knob of a lid of the cooking container 21.

The bottom of the base 1 holds a second fixed contact strip 9, while 14 indicates a third fixed contact strip connected to an informing device such as an acoustic alarm 12, for instance a buzzer or bell, which is in turn associated with a supply battery 13.

The measuring and signaling device 20 is generally removable and may be advantageously attached to any point of the external surface of a cooking container 21, such as a pan, in such a manner that the transducer device 10 is affixed to the wall of the container 21 transmitting the heat toward the outside. Alternatively, the device 20 may be applied to the container 21, by a spring or small collar to be hooked up to the knob of the lid of the container 21.

Other cases may envision the commercialization of a cooking container 21 equipped with a measuring and signaling device 20 according to this invention, permanently affixed to one of the walls of the container 21.

The operation of the device 20 is based on the action of the bimetallic element 8, connected to the negative pole 24 of the battery 13; the positive pole 25 of the battery 13 is connected to the positive pole 22 of the acoustic alarm 12, which is constituted, in particular, by the contact strip 14, while the negative pole 23 of the acoustic alarm 12, which is constituted, in particular, by the contact strip 6, is connected to the contact plate 7.

The plate 7 is controlled and actuated in advance by a user, by actuating the selector 3, to which it is firmly affixed, by the graduated reference scale 4, to the desired temperature value; when the product contained in the container 21 attains this temperature value, the device 20 informs the user, by a bell or a buzzer or any other suitable signal. The bimetallic element 8 intercepts, upon deforming in relation to the change of the internal temperature of the container 21 measured by the transducer 10 on which it is mounted, the positive contact of the plate 7, thus triggering the acoustic alarm 12.

This achieves, by the direct action of the bimetallic element 8, the closing of an electric circuit comprising the plate 7, the battery 13 and the bell or buzzer 12. It is moreover possible to provide for a readout of the temperature attained on the same graduated reference scale 4.

In this manner, the device for measuring and signaling the internal temperature 20 turns out to be independent of any shape or size of the container 21, as the particular type of attachment by a suction cup 11 allows its positioning and contact in various ways and at various points. Moreover, the device 20 turns out to be independent of the presence of a traditional visual or digital thermometer, as it indicates and measures the temperature in an independent manner.

The actuating system for the bell or buzzer 12 is only based on the use of the bimetallic element 8, without a need for other devices or electronic accessories; the bimetallic element 8 is therefore an essential item for reading the temperature, and simultaneously for actuating the acoustic alarm 12.

The above description clarifies the characteristics of the device for measuring and signaling the internal temperature of a container, in particular of a cooking container, object of this invention, as well as of its advantages, including:

extreme structural simplicity, which does not require sophisticated or complex electronic circuits, but merely some elementary mechanical fixtures;

simple temperature adjustment, ease of operation and the possibility for the user to divert his interest from any need to visually verify the temperature values attained;

simple production of the container and internal mechanism, which is universally applicable on any type of cooking container;

ease of positioning, applying and detaching the device, by using the fastener to the container, without any need by the user to search for a particular position or specification and without resorting to strips or welds;

limited cost with respect to the advantages gained.

Finally, it is possible to introduce further variants to the embodiments of the invention without abandoning the principle on which the inventive idea is based, just as it is possible, in the practical execution of the invention, to vary the materials and the sizes which may be selected at will and depending on the technical requirements.

What is new and desired to be secured by Letters Patent of the United States is:

1. A device for measuring and signaling an internal temperature of a container comprising:

a selector configured to provide for selection of a predetermined temperature value, said selector having a portion of conductive material affixed to said selector, a position of said portion of conductive material being adjusted upon selection of the predetermined temperature value;

a transducer configured to connect to said container;

an informing device;

a source of electrical energy configured to supply electricity to said informing device upon attainment of said predetermined temperature value; and a bimetallic element connected to said source of electrical energy, said transducer being anchored to said bimetallic element and configured to contact said portion of conductive material on said selector upon deformation of said bimetallic element based on temperature change within said container once said predetermined temperature value is reached thereby providing electricity to said informing device.

2. A device according to claim 1, wherein said selector includes a graduated reference scale that allows a user to select said predetermined temperature value with reference to said graduated reference scale.

3. A device according to claim 1, wherein said device comprises two separate parts including a lid and a base.

4. A device according to claim 1, wherein said bimetallic element is connected to a negative pole of said source of electrical energy, a positive pole of said source of electrical energy is connected to a positive pole of said informing device, and a negative pole of said informing device is connected to said portion of conductive material.

5. A device according to claim 4, wherein said positive and negative poles of said source of electrical energy and said informing device include fixed contact strips made of conductive material.

6. A device according to claim 5, wherein the device is constructed of two separate parts including a lid and a base, and wherein the device further comprises at least one friction gasket interposed between said lid and at least one of said fixed contact strips.

7. A device according to claim 1, wherein said informing device includes an acoustic alarm.

8. A device according to claim 1, further comprising at least one pivoting plate made of conductive material and firmly connected to said selector, wherein said bimetallic element contacts said at least one pivoting plate upon deforming in relation to the internal temperature of the container.

9. A device according to claim 1, wherein said transducer is made of metal.

10. A device according to claim 1, further comprising a fastener configured to attach the device to the container and including a suction cup or spring configured for attachment to a knob of the container.

11. A device according to claim 10, wherein said fastener is configured to be attached on any point of an external surface of the container.

12. A device according to claim 1, wherein the device is removable from the container.

13. A device according to claim 1, wherein the device is firmly mounted on the container.

14. A device for measuring and signaling an internal temperature of a container having a lid and a base comprising:
- an energy source;
- an informing device electrically connected to said energy source;
- a bimetallic element electrically connected to said energy source, said bimetallic element being configured to deform based upon a variation in the internal temperature of the container; and
- a selector having a conductive portion electrically connected to said informing device, said selector being configured to provide for selection of a predetermined temperature value;
- a position of said portion of conductive material being adjusted upon selection of the predetermined temperature value;
- wherein said bimetallic element contacts said conductive portion when the internal temperature of the container reaches said predetermined temperature value thereby creating a closed electrical loop and actuating said informing device.

15. A device according to claim 14, further comprising means for demountably attaching said device to the container.

16. A device according to claim 14, wherein said selector includes a graduated reference scale that allows a user to select said predetermined temperature value with reference to said graduated reference scale.

17. A device according to claim 14, wherein said informing device includes an acoustic alarm.

18. A device according to claim 14 wherein said bimetallic element is connected to a negative pole of said energy source, a positive pole of said energy source is connected to a positive pole of said informing device, and a negative pole of said informing device is connected to said conductive portion.

19. A device according to claim 18, wherein said positive and negative poles of said energy source and said informing device include fixed contact strips made of conductive material.

20. A device according to claim 19, wherein said device comprises two separate parts including a lid and a base, and wherein said device further comprises at least one friction gasket interposed between said lid and at least one of said fixed contact strips.

* * * * *